(12) United States Patent
Korah et al.

(10) Patent No.: US 9,317,133 B2
(45) Date of Patent: Apr. 19, 2016

(54) METHOD AND APPARATUS FOR GENERATING AUGMENTED REALITY CONTENT

(75) Inventors: Thommen Korah, Marina Del Rey, CA (US); Ronald Azuma, Santa Monica, CA (US)

(73) Assignee: Nokia Technologies Oy, Espoo (FI)

( * ) Notice: Subject to any disclaimer, the term of this patent is extended or adjusted under 35 U.S.C. 154(b) by 477 days.

(21) Appl. No.: 12/900,990

(22) Filed: Oct. 8, 2010

(65) Prior Publication Data

US 2012/0086727 A1   Apr. 12, 2012

(51) Int. Cl.
  *G09G 5/00*   (2006.01)
  *G06F 3/03*   (2006.01)
  *G06T 19/00*  (2011.01)

(52) U.S. Cl.
  CPC ............... *G06F 3/03* (2013.01); *G06T 19/006* (2013.01)

(58) Field of Classification Search
  USPC ........................................ 345/633, 632, 629
  See application file for complete search history.

(56) References Cited

U.S. PATENT DOCUMENTS

| | | | |
|---|---|---|---|
| 6,711,293 | B1 | 3/2004 | Lowe |
| 6,912,293 | B1 * | 6/2005 | Korobkin .................. 382/100 |
| 8,108,144 | B2 * | 1/2012 | Forstall et al. ............. 701/426 |
| 8,207,964 | B1 * | 6/2012 | Meadow et al. ............ 345/419 |
| 2002/0130906 | A1 | 9/2002 | Miyaki |
| 2003/0169903 | A1 | 9/2003 | Yoshikawa et al. |
| 2004/0194129 | A1 | 9/2004 | Carlbom et al. |
| 2005/0051623 | A1 | 3/2005 | Okuda et al. |
| 2005/0085999 | A1 | 4/2005 | Onishi |
| 2006/0002590 | A1 | 1/2006 | Borak |
| 2007/0053551 | A1 | 3/2007 | Kubo et al. |
| 2007/0162942 | A1 | 7/2007 | Hamynen et al. |
| 2007/0192020 | A1 | 8/2007 | Brulle-Drews et al. |
| 2007/0242086 | A1 * | 10/2007 | Tsujimoto et al. ............ 345/632 |
| 2008/0181507 | A1 * | 7/2008 | Gope et al. ................... 382/190 |
| 2008/0211809 | A1 | 9/2008 | Kim et al. |
| 2008/0240573 | A1 | 10/2008 | Nakamura et al. |
| 2008/0310757 | A1 | 12/2008 | Wolberg et al. |
| 2009/0109216 | A1 | 4/2009 | Uetabira |

(Continued)

FOREIGN PATENT DOCUMENTS

| | | |
|---|---|---|
| AU | 2007362729 A1 | 7/2009 |
| CA | 2 709 740 A1 | 7/2009 |

(Continued)

OTHER PUBLICATIONS

Heinrich et al., ARWeather—An Augmented Reality Weather System, 2008, IEEE International Symposium on Mixed and Augmented Reality, 187-188.*

(Continued)

*Primary Examiner* — M Good Johnson
(74) *Attorney, Agent, or Firm* — Ditthavong & Steiner, P.C.

(57) ABSTRACT

An approach is provided for providing augmented reality based on tracking. Information, including location information, orientation information, or a combination thereof of a device is determined. A representation of a location indicated based, at least in part, on the information is determined. One or more items are selected to associate with one or more points within the representation. Display information is determined to be generated, the display information including the one or more items overlaid on the representation based, at least in part, on the one or more points.

16 Claims, 9 Drawing Sheets

(56) References Cited

U.S. PATENT DOCUMENTS

| | | | |
|---|---|---|---|
| 2009/0289955 A1* | 11/2009 | Douris et al. | 345/630 |
| 2010/0161658 A1 | 6/2010 | Hamynen et al. | |
| 2010/0214291 A1 | 8/2010 | Muller et al. | |
| 2011/0063295 A1 | 3/2011 | Kuo et al. | |
| 2011/0103651 A1* | 5/2011 | Nowak et al. | 382/106 |
| 2011/0164163 A1* | 7/2011 | Bilbrey et al. | 348/333.01 |
| 2011/0279445 A1* | 11/2011 | Murphy et al. | 345/419 |
| 2011/0302527 A1* | 12/2011 | Chen et al. | 715/800 |

FOREIGN PATENT DOCUMENTS

| | | |
|---|---|---|
| CN | 12928494 A | 3/2007 |
| CN | 101275841 A | 10/2008 |
| CN | 101379369 A | 3/2009 |
| CN | 101903745 A | 12/2010 |
| DE | 20 2007 018 604 U1 | 4/2009 |
| DE | 20 2007 018 605 U1 | 4/2009 |
| EP | 1 594 322 A2 | 11/2005 |
| EP | 1 612 707 A2 | 1/2006 |
| EP | 1 681 537 A1 | 7/2006 |
| EP | 1 796 048 A2 | 6/2007 |
| EP | 1 971 825 A1 | 9/2008 |
| EP | 1 975 565 A2 | 10/2008 |
| EP | 2 183 724 A1 | 5/2010 |
| EP | 2 223 041 A1 | 9/2010 |
| GB | 2 413 021 A | 10/2005 |
| JP | 2002-340588 A | 11/2002 |
| JP | 2003-263104 A | 9/2003 |
| JP | 2005-083941 A | 3/2005 |
| JP | 2005-121650 A | 5/2005 |
| JP | 2006-030208 A | 2/2006 |
| JP | 2007-074326 A | 3/2007 |
| JP | 2008-0250687 A | 10/2008 |
| JP | 2010-238098 A | 10/2010 |
| JP | 2011-506983 A | 3/2011 |
| KR | 20080076611 A | 8/2008 |
| KR | 20080084859 A | 9/2008 |
| NL | 2002099 C2 | 6/2009 |
| NL | 2002105 A1 | 6/2009 |
| NL | 2002105 C | 4/2011 |
| RU | 2008 132 293 A | 2/2010 |
| WO | WO 96/31047 A2 | 10/1996 |
| WO | WO 2005/098362 A1 | 10/2005 |
| WO | WO 2007/080473 A1 | 7/2007 |
| WO | WO 2007/128452 A2 | 11/2007 |
| WO | WO 2008/143523 A1 | 11/2008 |
| WO | WO 2009/015501 A1 | 2/2009 |
| WO | WO 2009/080070 A1 | 7/2009 |

OTHER PUBLICATIONS

Madsen, Claus B., Tommy Jensen, and Mikkel S. Andersen. "Real-time image-based lighting for outdoor augmented reality under dynamically changing illumination conditions." International conference on Graphics Theory and Applications, GRAPP 2006, pp. 364-371.*

International Search Report for related International Patent Application No. PCT/FI2011/050853 dated Feb. 13, 2012, pp. 1-7.

International Search Report for related International Patent Application No. PCT/FI2011/050864 dated Feb. 20, 2012, pp. 1-7.

International Written Opinion for related International Patent Appliation No. PCT/FI2011/050853 dated Feb. 13, 2012, pp. 1-9.

International Written Opinion for related International Patent Application No. PCT/FI2011/050864 dated Feb. 20, 2012, pp. 1-9.

U.S. Appl. No. 12/790,288, filed May 28, 2010, Wither, Jason et al. 3D SSD tracking with estimated 3D planes, Cobzas et al., Image and Vision Computing 27 (2009) 69-79.

Augmented Reality Scouting for Interactive 3D Reconstruction, Reitinger et al., abstract only, in Virtual Reality Conference, IEEE, 2007, 1 page.

Augmented Reality Scouting for Interactive 3D Reconstruction, Reitinger et al., accessed on: Nov. 30, 2010, http://www.icg.tu-graz.ac.at/publications/pdf/reitingerarscouting07/at_download/file, pp. 1-4.

Estimating Natural Illumination from a Single Outdoor Image, Lalonde et al., accessed on: Dec. 3, 2010, http://graphics.cs.cmu.edu/projects/outdoorIllumination/lalonde_iccv_09.pdf, pp. 1-8.

Fusing Online and Offline Information for Stable 3D Tracking in Real-Time, Vacchetti et al., accessed on Nov. 30, 2010, http://cvlab.epfl.ch/publications/publications/2003/VacchettiLF03.pdf, pp. 1-8.

Image Fusion for Context Enhancement and Video Surrealism, Raskar et al., TR2004-039, Jun. 2004, International Symposium on Non-Photorealistic Animation and Rendering, pp. 1-12.

Location-Based Games, accessed on: Dec. 3, 2010, http://en.wikipedia.org/wiki/Location-based_game, pp. 1-4.

Markerless Tracking using Planar Structures in the Scene, Simon et al., accessed on Nov. 30, 2010, http://www.robots.ox.ac.uk/~vgg/publications/papers/simon00.pdf, pp. 1-9.

Parallel Tracking and Mapping for Small AR Workspaces, Klein et al., accessed on: Dec. 3, 2010, http://www.robots.ox.ac.uk/~gk/publications/KleinMurray2007ISMAR.pdf, pp. 1-10.

Parallel Tracking and Mapping on a Camera Phone, Klein et al., accessed on: Dec. 3, 2010, http://www.robots.ox.ac.uk/~gk/publications/KleinMurray2009ISMAR.pdf, pp. 1-4.

Pose Tracking from Natural Features on Mobile Phones, Wagner et al., accessed on: Dec. 3, 2010, http://www.icg.tugraz.at/publications/pdf/WAGNER_ISMAR08_NFT.pdf, pp. 1-10.

Robust Spatiotemporal Analysis of Architectural Imagery, Korah, Thommen, University of Delaware, 2007, pp. 1-190.

Seeing the World Behind the Image: Spatial Layout for 3D Scene Understanding, Hoiem, Derek, Aug. 2007, Robotics Institute, Carnegie Mellon University, pp. 1-153.

SURFTrac: Efficient Tracking and Continuous Object Recognition using Local Feature Descriptors, Ta et al., accessed on: Dec. 3, 2010, http://people.csail.mit.edu/kapu/papers/nguyen_cvpr09.pdf, pp. 1-8.

The Westwood Experience: Connecting Story to Locations Via Mixed Reality, Wither et al.,IEEE International Symposium on Mixed and Augmented Reality 2010, Arts, Media and Humanities Proceedings, Oct. 13-16, Seoul, Korea, pp. 39-46.

Tracking with Reference Images: A Real-Time and Markerless Tracking Solution for Out-Door Augmented Reality Applications, Stricker, Didier, abstract only, in Proceedings of the 2001 conference on Virtual reality, archeology, and cultural heritage, 2001, pp. 1-2.

Tracking with Reference Images: A Real-Time and Markerless Tracking Solution for Out-Door Augmented Reality Applications, Stricker, Didier, accessed on: Nov. 30, 2010, http://archeoguide.intranet.gr/papers/publications/ARCHEOGUIDE-VAST01-2.pdf, pp. 1-5.

Office Action for related U.S. Appl. No. 12/939,558 dated Sep. 18, 2012, pp. 1-49.

* cited by examiner

US 9,317,133 B2

METHOD AND APPARATUS FOR GENERATING AUGMENTED REALITY CONTENT

BACKGROUND

Service providers and device manufacturers (e.g., wireless, cellular, etc.) are continually challenged to deliver value and convenience to consumers by, for example, providing compelling network services. One area of interest has been the development of location-based services (e.g., navigation services, mapping services, augmented reality applications, etc.) that have greatly increased in popularity, functionality, and content. Augmented reality applications allow users to see a view of the physical world merged with virtual objects in real time. However, with the increase in the available content and functions such services and applications, service providers and device manufacturers face significant technical challenges to efficiently track the location of a device while the device is moving to provide such augmented reality content.

SUMMARY

Therefore, there is a need for an approach for providing augmented reality based on tracking.

According to one embodiment, a method comprises determining information including location information, orientation information, or a combination thereof of a device. The method also comprises determining a representation of a location indicated based, at least in part, on the information. The method further comprises selecting one or more items to associate with one or more points within the representation. The method additionally comprises determining to generate display information including the one or more items overlaid on the representation based, at least in part, on the one or more points.

According to another embodiment, an apparatus comprises at least one processor, and at least one memory including computer program code, the at least one memory and the computer program code configured to, with the at least one processor, cause, at least in part, the apparatus to determine information including location information, orientation information, or a combination thereof of a device. The apparatus is also caused to determine a representation of a location indicated based, at least in part, on the information. The apparatus is further caused to select one or more items to associate with one or more points within the representation. The apparatus is additionally caused to determine to generate display information including the one or more items overlaid on the representation based, at least in part, on the one or more points.

According to another embodiment, a computer-readable storage medium carries one or more sequences of one or more instructions which, when executed by one or more processors, cause, at least in part, an apparatus to determine information including location information, orientation information, or a combination thereof of a device. The apparatus is also caused to determine a representation of a location indicated based, at least in part, on the information. The apparatus is further caused to select one or more items to associate with one or more points within the representation. The apparatus is additionally caused to determine to generate display information including the one or more items overlaid on the representation based, at least in part, on the one or more points.

According to another embodiment, an apparatus comprises means for determining information including location information, orientation information, or a combination thereof of a device. The apparatus also comprises means for determining a representation of a location indicated based, at least in part, on the information. The apparatus further comprises means for selecting one or more items to associate with one or more points within the representation. The apparatus additionally comprises means for determining to generate display information including the one or more items overlaid on the representation based, at least in part, on the one or more points.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing augmented reality based on tracking are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
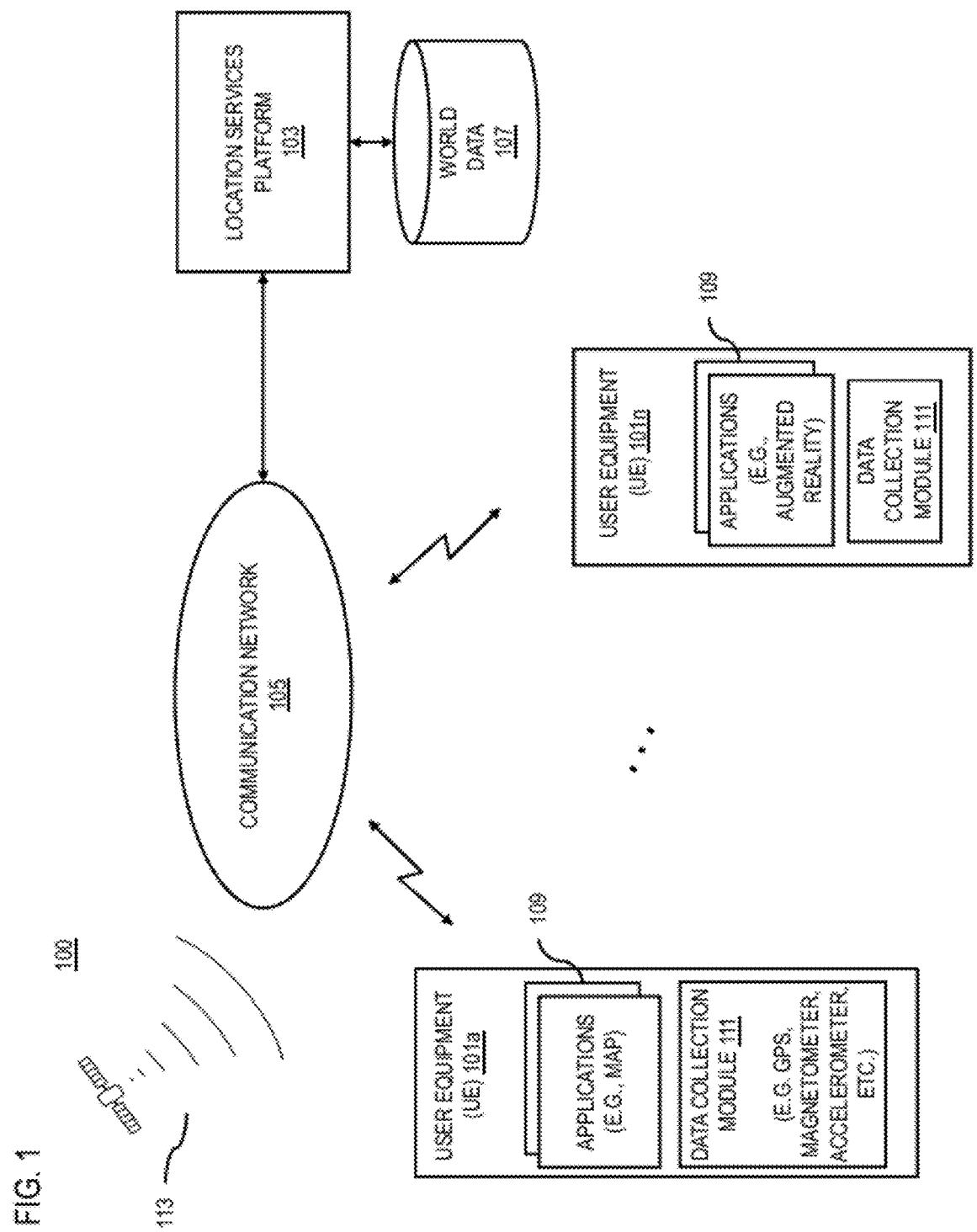
FIG. 1 is a diagram of a system capable of providing augmented reality based on tracking, according to one embodiment.

FIG. 1 is a diagram of a system capable of providing augmented reality based on tracking, according to one embodiment. It is noted that mobile devices and computing devices in general are becoming ubiquitous in the world today and with these devices, many services are being provided. These services can include augmented reality (AR) and mixed reality (MR) services and applications. AR allows a user's view of the real world to be overlaid with additional visual information. MR allows for the merging of real and virtual worlds to produce visualizations and new environments. In MR, physical and digital objects can co-exist and interact in real time. Thus, MR can be a mix of reality, AR, virtual reality, or a combination thereof. A key challenge in AR is to accurately track the camera pose so that the virtual objects appear registered with objects in the real environment. Image-based tracking traditionally relied on artificial markers or fiducials placed in a controlled scene. More recently, computer vision techniques have been used to track point features through an image sequence in order to estimate Six Degrees of Freedom (6DOF) pose on a mobile device. Although various embodiments are described with respect to AR, it is contemplated that the approach described herein may be used with other user interface situations such as MR and virtual reality.

Mixed Reality is particularly compelling for user experiences like virtual tourism, location-based games, and interactive story-telling, etc. Many of these occur in populated, urban environments with rich history and culture. To create an immersive experience that mixes elements of the virtual with the real, conventional AR requires a tracking system to be stable under extreme conditions.

Frame-to-frame tracking allows the virtual content to appear registered with a video stream from a camera of a device. Tracking technologies can treat the scene as a rigid set of features that are first detected and then tracked between frames. Features may be points, lines, curves, or other parametric shapes with unique intensity distributions that allow making correspondences. To make tracking on a device real-time, systems may simplify proven computer vision technologies to make it less processing intensive. However, this can adversely affect the tracking quality. Because these computer vision technologies are processing intensive, a significant amount of computation may be expended for low-level registration tasks (e.g., detecting or matching certain portions of an streaming camera feed), which prevents more contextual and higher-level processing that could enhance a user's overall experience.

In uncontrolled outdoor environments, reliable tracking in real-time on a device with limited processing capability introduces many additional challenges. Typical tracking systems rely on a smooth camera motion to restrict the search for visual feature correspondences. But these assumptions may not hold in the presence of shadows, occlusion, variable lighting conditions, and multiple distracting motions, significantly affecting the stability of tracking. Traditionally, AR content is overlaid on a raw camera stream. Even when stable tracking is feasible, there is an obvious visual discrepancy between virtual content and the low resolution camera stream. For example, the device's camera may not be as sharp as or may have unlit pixels due to lighting while the virtual content is completely separate and looks vibrant. Seeing low resolution images in bright outdoor conditions can also be challenging. Effectively, such Mixed Reality is forced to make many technical compromises that hamper the quality of an experience.

To address these problems, a system 100 of FIG. 1 introduces the capability to provide augmented reality based on tracking, according to one embodiment. A combination of approximate tracking with semantic knowledge of a scene and its elements can be utilized to provide AR. This allows the system 100 to blend elements of the real world into a virtual canvas, increasing a user's sense of presence and immersion. Because the geometry of the virtual world is known beforehand, a consistent visual representation can be presented to the user.

Further, a modeled environment can act as the virtual canvas on which virtual objects are overlaid. This allows shifting computation from transient frame-to-frame tracking towards more permanent recognition and understanding modules. Because virtual content is not overlaid on a real-time camera feed, approximate tracking (at reduced computation) can be utilized to infer a user's approximate pose. By utilizing approximate tracking, a higher error tolerance can be met while still presenting a compelling user experience. As such, large-scale outdoor experiences can be presented to one or more users utilizing the system 100.

User equipment (UEs) 101a-101n can communicate with a location services platform 103 via a communication network 105 to utilize world data 107 to generate and present location based information to users of the UEs 101. Applications 109, such as a map application, navigation application, AR application, or the like executing on the UE 101 can be utilized process world data 107 and present the world data 107 to the user. The location services platform 103 can be implemented using one or more computers or servers, for example using the chipset described in FIG. 8.

A data collection module 111 of the UE 101 can collect location information (e.g., Global Positioning System (GPS) information based on one or more GPS satellites 113, Assisted GPS (A-GPS), cell of origin information, etc.), orientation information (e.g., magnetometer information, accelerometer information, etc.), combinations thereof, etc. to determine information utilized in requesting world data 107 from the location services platform 103. In certain embodiments, world data 107 or subsets of the world data 107 can be stored on the UE 101. The world data 107 can include map information. Map information may include maps, satellite images, street and path information, item information such as point-of-interest (POI) information, signing information associated with maps, objects and structures associated with the maps, information about people and the locations of people, coordinate information associated with the information, etc., or a combination thereof. An item may be an object (e.g., a representation of a physical object) or a virtual object (e.g., images, audio, video, icons, advertisements, etc.) that can be associated with a location. Further, world data can include information associated with Light Detection and Ranging (LIDAR) pointclouds acquired by one or more service providers (e.g., NAVTEQ, GOOGLE MAPS, etc.).

A POI can be a specific point location that a person may, for instance, find interesting or useful. Examples of POIs can include an airport, a bakery, a dam, a landmark, a restaurant, a hotel, a building, a park, the location of a person, or any point interesting, useful, or significant in some way. In some embodiments, the map information and the maps presented to the user may be a simulated 3D environment. In certain embodiments, the simulated 3D environment is a 3D model created to approximate the locations of streets, buildings, features, etc. of an area. This model can then be used to render the location from virtually any angle or perspective for display on the UE 101. Further, in certain embodiments, the graphical user interface (GUI) presented to the user may be based on a combination of real world images (e.g., a camera view of the UE 101 or a panoramic image) and the 3D model. The 3D model can include one or more 3D object models (e.g., models of buildings, trees, signs, billboards, lampposts, etc.). Each 3D object model can be associated with a particular location (e.g., GPS coordinates or other location coordinates, which may or may not be associated with the real world) and can be identified using one or more identifier. A data structure can be utilized to associate the identifier and the location with a comprehensive 3D map model of a physical environment (e.g., a city, the world, etc.). A subset or the set of data can be stored on a memory of the UE 101. Further, items can be associated with the 3D model and placed based on location coordinates. This can additionally take into account occluding parts of the 3D model.

A representation of a location can be determined based on the collected information. This representation can be generated at the location services platform 103 and/or the UE 101. The representation can include an image (e.g., a panoramic image), a model (e.g., a 3D model), combinations thereof, etc. Further, the representation can be preprocessed at the location services platform 103 according to one or more criteria. For example, the criteria can be based on time parameters and/or weather parameters. A time parameter may be utilized to preprocess a 3D model and/or image based on a time of day. In this manner, the 3D model and/or the image may be lightened or darkened based on one or more algorithms to coincide with lighting in a real world situation. The location services platform 103 and/or another platform may be utilized to track sunlight based on time. Further, an algorithm may be utilized in processing the image or model according to the time parameters. Additionally or alternatively, weather information can be tracked and/or utilized instead or in addition to the time. As such, if it is snowing at a location that the UE 101 is being used, the representation can be preprocessed to include snow. In certain embodiments, the preprocessing can occur before any request for a representation while in other embodiments, the preprocessing can occur at the location services platform 103 in response to a request for the representation. The representation can be processed at the UE 101.

The UE 101 can request and receive preprocessed world data 107 from the location services platform 103. The world data 107 can include the representation, items, POI information, combinations thereof, etc. One or more items are then associated with one or more points within the representation. For example, a POI item can be associated, based on a spatial layout, with particular points of an image or model. Then, the application 109 can generate display information including the POI item (or additional items) overlaid on the representation based on one or more of the points.

Further, with this approach, pre-computed representations (e.g., the full 3D models, panoramic images, user-generated images, etc.) can be leveraged to incorporate elements of scene understanding and approximate camera tracking to improve the quality of an AR experience. For example, scene understanding of an environment can be improved by processing the representation by incorporating time and/or weather elements. As such, a virtual representation (e.g., from the world data 107) can be augmented instead of raw camera information. Thus, the UE 101 need not act as the lens through which a scene is viewed. Instead, the user's peripheral vision can provide context to a rich or augmented representation of the real world that is shown on the UE 101. With this approach, world data 107 (e.g., panoramic images, LIDAR, 3D models, maps, user images, other associated images, etc.) can be restyled to match real-conditions associated with a location. In one scenario, other associated images can be associated with a story, game, historical narrative, or a combination thereof. Thus, one or more of the associated images can be tagged to a particular location in the world data 107 and later utilized in one or more applications 109. These associated images can be a photorealistic rendering of the environment or a non-photorealistic rendering of the environment. With either approach, the renderings can be augmented based on the parameters to match current conditions (e.g., include weather or lighting/shadowing in an image generated utilizing drawings based on the parameters).

Moreover, approximate localization and tracking can be utilized to limit the processing needed at the UE 101. As such, image feature can be associated with information about their geometry in a 3D scene. A source of such information can rely on fast semantic classification of an image into ground, vertical surfaces, sky regions, etc. as further detailed in FIG. 4. Another such source of information can include information regularly found in urban environments to detect grid patterns of rectangular elements that often signal the presence of planar surfaces. Tracking of multiple planes can be accomplished in 3D with constraints on perpendicularity or co-planarity as further detailed in FIG. 5. Thus pixel accurate camera tracking under uncontrolled circumstances need not be utilized to generate a good user experience for users of augmented reality applications 109.

Additionally or alternatively, generating an augmented reality experience can involve embedding relevant aspects of the real world into a canvas (e.g., an urban canvas, a suburban canvas, a rural canvas, etc.) or restyling a virtual world to better match real-time conditions. As noted above, weather and/or time parameters can be utilized to augment representations. Further, other elements of a real-time environment can be incorporated in the scene generated by the augmented representation. For example, moving elements (e.g., cars, people, etc.) can be detected using an algorithm and incorporated into the scene.

With these approaches, natural feature tracking need not occur in isolation with the sole intent of estimating a camera pose every frame. The feature tracking can be combined with high-level domain knowledge (e.g., pre-processed world data 107) of the scene that provides strong context about the geometric relationships between image features. This knowledge may come from assumptions based on characteristics of outdoor urban environments, or it may be garnered from visual data previously collected at the specific location of interest (e.g., collected by a service such as NAVTEQ, GOOGLE MAPS, etc.). Man-made environments are strongly structured and contain a number of regularities. The dominant orientations of line and plane features within the image can thus be consistent with the geometry of the scene. Many urban structures exhibit symmetry and repetition, a cue that can be exploited to overcome occlusions and other distractions.

Two dimensional approaches to feature tracking (e.g., based on real-time streaming images) cannot adequately address the problems posed by occlusions, clutter, and lighting changes. More sophisticated features such as Scale Invariant Feature Transform (SIFT) and Speeded Up Robust Features (SURF) that are robust to some of these effects are not practical for real-time implementation (e.g., on a mobile UE 101 such as a mobile phone). The current tracking system offers advantages from standard feature-based techniques because the system augments tracks with hierarchical semantic information such as the surface a feature belongs to (ground, building, sky, etc.). It can also identify features that adhere to some global constraint and move cohesively, such as windows that form a lattice or grid pattern. Image processing can further benefit from assumptions that are modeled statistically based on training data. For example, most people take pictures with their camera held upright. An estimate of the ground plane, on which virtual objects can be placed, should therefore be biased towards appearing lower in the image. With these approaches, there is a higher margin for error with a less than 100% recognition rate for tracking items. As such, the system 100 is less computation intensive and allows for approximations when, for example, the UE 101 moves.

In general, registering a camera image from an image sensor with the virtual canvas (e.g., a representation) can involve a "semantic matching" of higher-level features extracted from the two modalities. An example of a semantic property of a scene is the grid of windows found on a building facade such as the building shown in FIG. 5. Because the semantics of a scene do not change abruptly and are less sensitive to small changes in lighting or motion, the application 109 need not process every single frame from scratch. Once extracted, matching high-level features can reduce the dimensionality of the problem. As such, it can be more efficient to find a corresponding 4×4 grid of windows on a known building than to match hundreds of SIFT or SURF features scattered across consecutive frames of an image sequence. Even a single image can provide valuable information about the structural layout of the scene.

In one embodiment, the system 100 utilizes a tracking framework that can provide a more consistent AR experience on a UE 101 in various environments (e.g., an outdoor urban environment). Visual data from the location of interest can be utilized to model the environment off-line at the location services platform 103. In particular, we vast amounts of LIDAR pointclouds, maps, and panoramic imagery may be collected in cities, suburban areas, and rural areas all over the world. A modeled environment can be generated using one or more conventional techniques (e.g., techniques utilized in creating current NAVTEQ models). The modeled environment can act as a virtual canvas on which augmented content can be utilized. Both geometric and photometric registration between many virtual objects and the canvas can be much higher fidelity due to the lack of real-time constraints (e.g., by use of preprocessing information) and the availability of pre-collected data from the location of interest. The real-time challenges are therefore include localization (e.g., registering sensor data from the data collection module 111), semantically blending elements of the real world into the canvas, and to restyle the virtual world to better match the real (e.g., based on time or weather parameters).

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and location services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the location services platform 103 may interact according to a client-server model with the applications 109 of the UE 101. According to the client-server model, a client process sends a message including a request to a server process, and the server process responds by providing a service (e.g., augmented reality image processing, augmented reality image retrieval, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
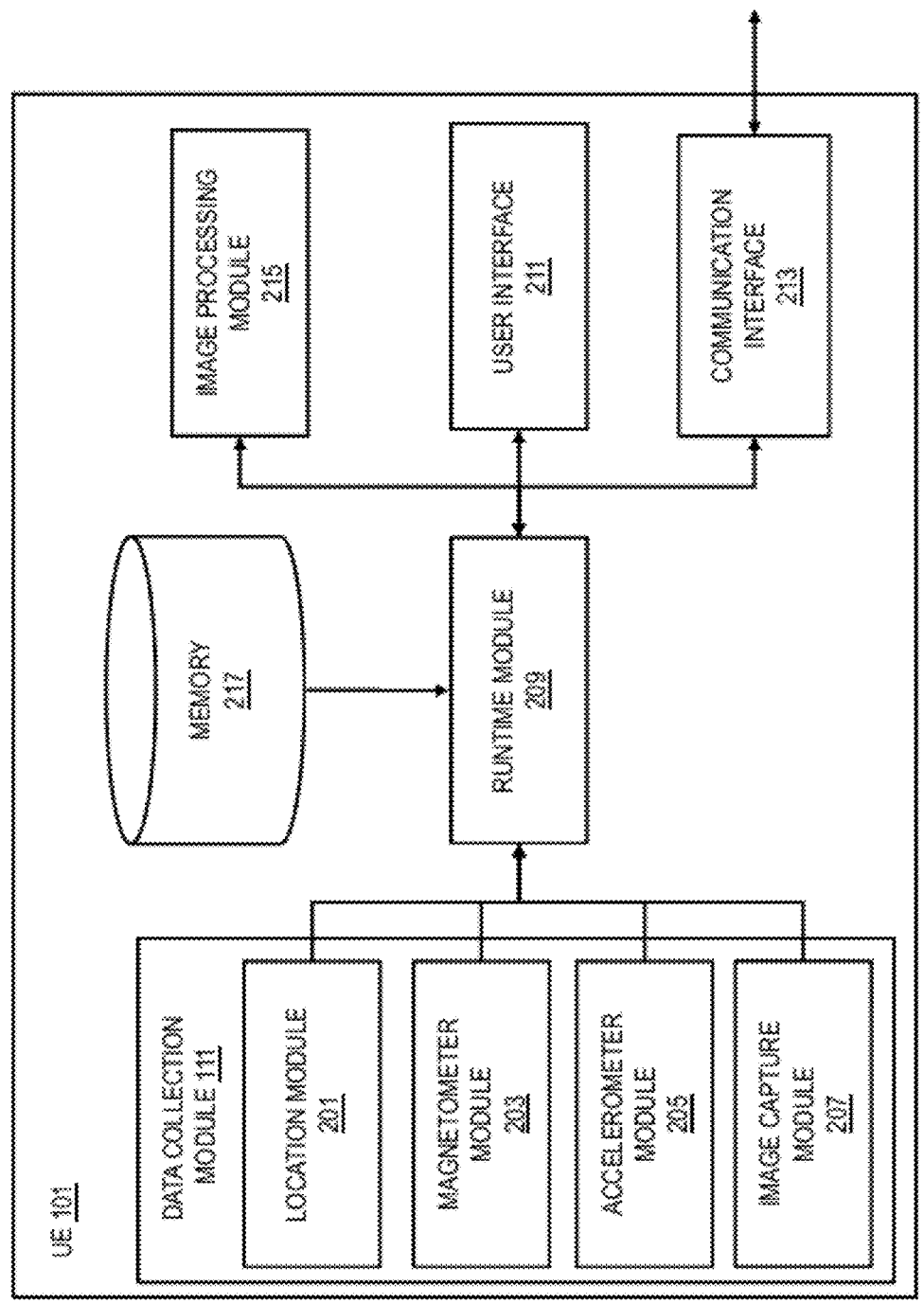
FIG. 2 is a diagram of the components of user equipment, according to one embodiment.

FIG. 2 is a diagram of the components of user equipment, according to one embodiment. By way of example, a UE 101 includes one or more components for providing a GUI with utilized in a reality (e.g., augmented reality) experience. It is contemplated that the functions of these components may be combined in one or more components or performed by other components of equivalent functionality. In this embodiment, the UE 101 includes a data collection module 111 that may include one or more location modules 201, magnetometer modules 203, accelerometer modules 205, image capture modules 207, the UE 101 can also include a runtime module 209 to coordinate use of other components of the UE 101, a user interface 211, a communication interface 213, an image processing module 215, and memory 217. An application 109 (e.g., the location services application) of the UE 101 can execute on the runtime module 209 utilizing the components of the UE 101.

The location module 201 can determine a user's location. The user's location can be determined by a triangulation system such as GPS, A-GPS, Cell of Origin, or other location extrapolation technologies. Standard GPS and A-GPS systems can use satellites 113 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media (e.g., images, video, etc.) is captured. In one embodiment, GPS coordinates are embedded into metadata of captured media (e.g., images, video, etc.) or otherwise associated with the UE 101 by the application 109. In other embodiments, the location coordinates can be formatted in a file (e.g., as a vector) and sent to the location services platform 103 independently of any media. Moreover, in certain embodiments, the GPS coordinates can include an altitude to provide a height. The altitude can be determined using another type of altimeter. In certain scenarios, the location module 201 can be a means for determining a location of the UE 101, an image, or used to associate an object (e.g., a person, a moving element, etc.) or item (e.g., a POI) in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is embedded into the metadata of captured or streaming media or otherwise associated with the UE 101 (e.g., by including the information in a request to a location services platform 103) by the location services application 109. The request can be utilized to retrieve one or more items, representations, images, etc. associated with the location and/or orientation.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In one embodiment, vertical directional data obtained from an accelerometer is embedded into the metadata of captured or streaming media or otherwise associated with the UE 101 by the location services application 109. In certain scenarios, the magnetometer module 203 and accelerometer module 205 can be means for ascertaining a perspective of a user. Further, the orientation in association with the user's location can be utilized to map the location of the UE 101 to one or more images (e.g., panoramic images and/or camera view images) and/or a 3D model view.

In one embodiment, the communication interface 213 can be used to communicate with a location services platform 103 or other UEs 101. Certain communications can be via methods such as an internet protocol, messaging (e.g., SMS, MMS, etc.), or any other communication method (e.g., via the communication network 105). In some examples, the UE 101 can send a request to the location services platform 103 via the communication interface 213. The location services platform 103 may then send a response back via the communication interface 213. In certain embodiments, location and/or orientation information is used to generate a request to the location services platform 103 for one or more images (e.g., panoramic images) of one or more objects, one or more map location information, a 3D map, etc.

The image capture module 207 can be connected to one or more media capture devices. The image capture module 207 can include optical sensors and circuitry that can convert optical images into a digital format. Examples of image capture modules 207 include cameras, camcorders, etc. Moreover, the image capture module 207 can process incoming data from the media capture devices. For example, the image capture module 207 can receive a video feed of information relating to a real world environment (e.g., while executing the location services application 109 via the runtime module 209). The image capture module 207 can capture one or more images from the information and/or sets of images (e.g., video). These images may be processed by the image processing module 215 to extract one or more real-time elements. These elements can be added to an environment representation received from world data 107 to be presented via the user interface 211. The image processing module 215 may be implemented via one or more processors, graphics processors, etc. In certain embodiments, the image capture module 207 can be a means for determining one or more images.

The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 211 may be used to display maps, navigation information, camera images and streams, augmented reality application information, POIs, virtual reality map images, panoramic images, etc. from the memory 217 and/or received over the communication interface 213. Input can be via one or more methods such as voice input, textual input, typed input, typed touch-screen input, other touch-enabled input, etc. In certain embodiments, the user interface 211 and/or runtime module 209 can be means for causing presentation of display information.

Figure 3:
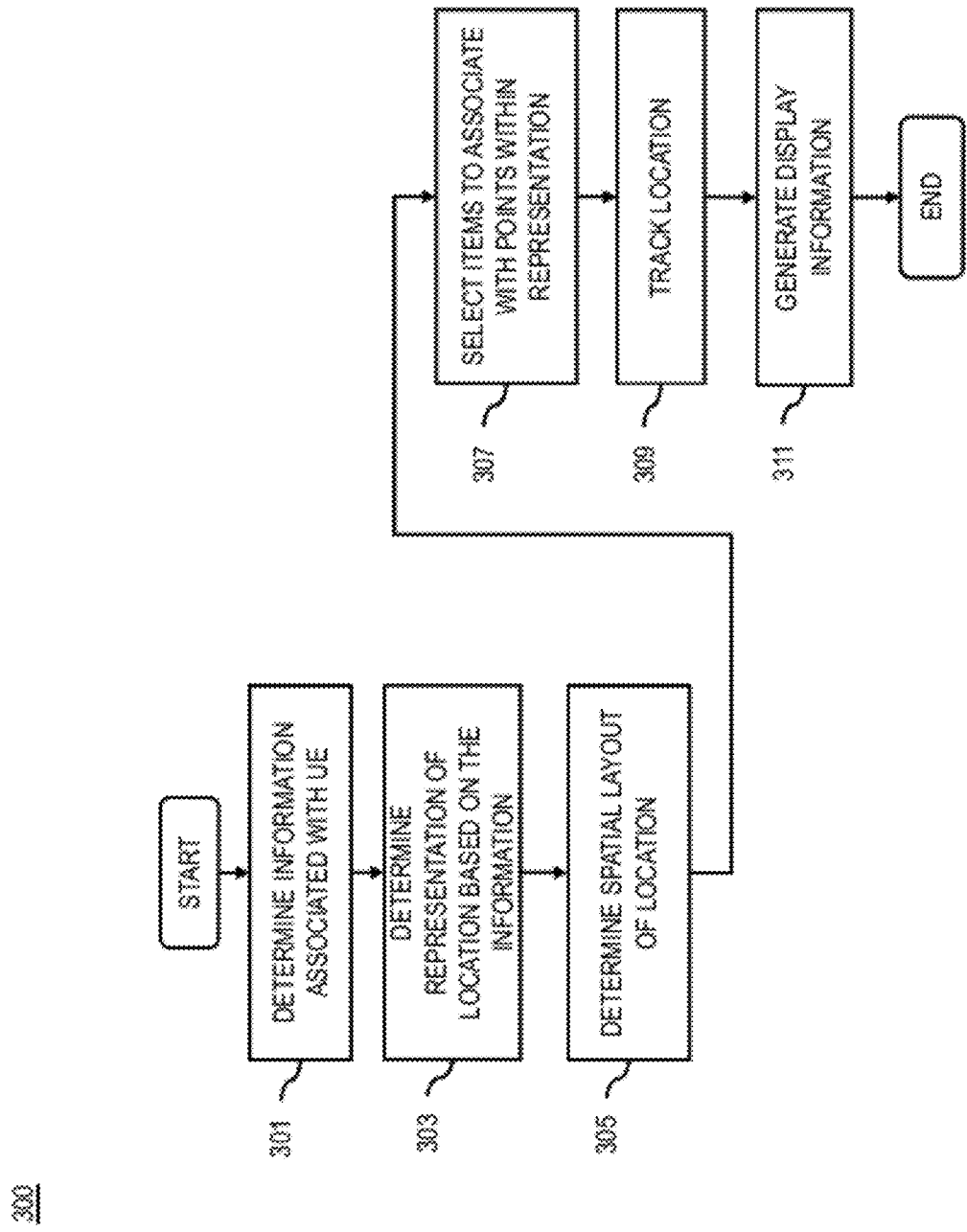
FIG. 3 is a flowchart of a process for providing augmented reality based on tracking, according to one embodiment.
Figure 8:
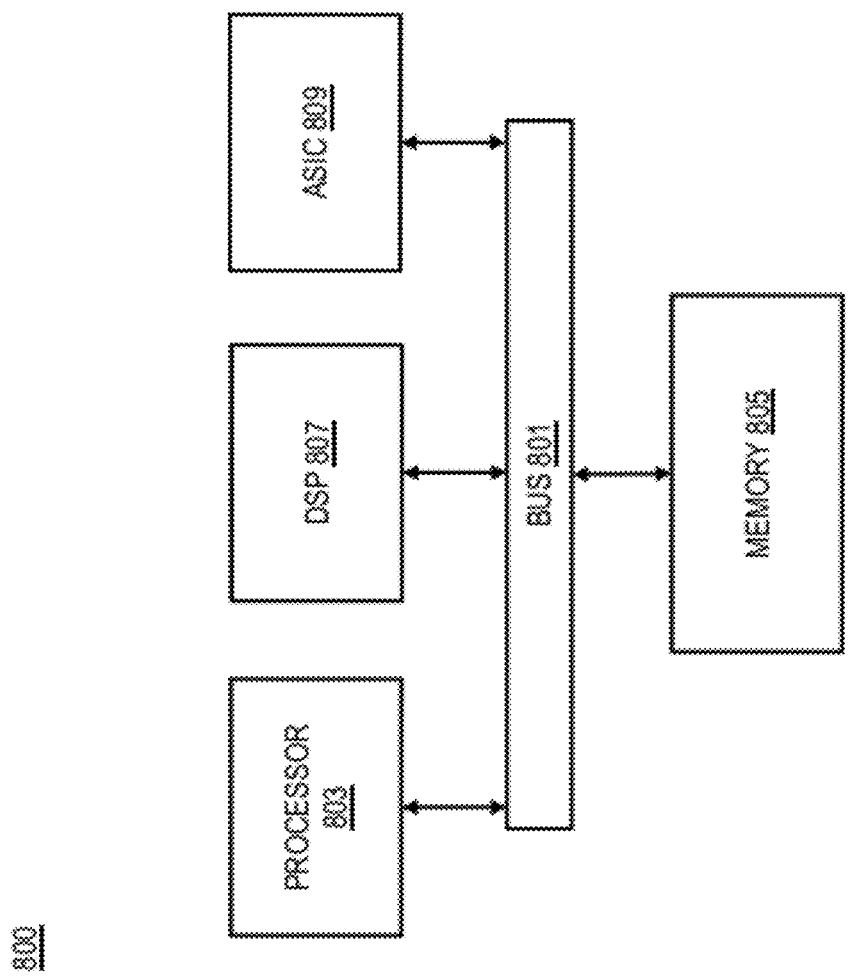
FIG. 8 is a diagram of a chip set that can be used to implement an embodiment of the invention.

FIG. 3 is a flowchart of a process for providing augmented reality based on tracking, according to one embodiment. In one embodiment, the runtime module 209 of a UE 101 performs the process 300 and is implemented in, for instance, a chip set including a processor and a memory as shown in FIG. 8. Additionally or alternatively, one or more portions of the process 300 can be implemented via another device (e.g., the location services platform 103). As such, the runtime module 209 and/or other devices can be utilized as means for implementing one or more steps of the process 300.

The UE 101 can initialize an application 109 that may utilize AR or MR information. The user can additionally utilize the UE 101 for capturing one or more images (e.g., a stream of images). In step 301, one or more sensors of the data collection module 111 can be utilized to determine information including location information, orientation information, combinations thereof, etc. As noted above, this information may include location coordinates, accelerometer data, magnetometer/compass data, etc. This information can be transmitted to the location services platform 103, which can determine the information by receiving the information from the UE 101.

Then, at step 303 the runtime module 209 determines a representation of a location indicated based, at least in part, on the information. This representation can be originally determined at the location services platform 103 and transmitted to the UE 101. As such, the UE 101 can receive the representation from the location services platform 103 to determine the representation. Additionally or alternatively, the representation can be determined using processing at the UE 101 using a set of the world data 107. Further, the representation can be a substitute for a real-time image of the location that may be captured via the image capture module 207. The representation can include a model (e.g., a 3D model described above, a panorama image, other images, or the like.

At step 305 a spatial layout of the location is determined. The spatial layout can be determined by the location services platform 103 and be preprocessed. As such, the representation may be based on the preprocessed information that may be stored as world data 107. One or more portions (e.g., sky, ground, vertical features such as buildings, etc.) of the spatial layout can be determined as further detailed in FIGS. 4 and 5. The UE 101 can receive preprocessed spatial layout information from the location services platform 103 and/or determine the spatial layout according to one or more conventional image processing algorithms using the image processing module 215. These algorithms can be utilized to approximate the location of items based on points associated with planes as previously mentioned and further detailed in FIGS. 4 and 5.

The runtime module 209 can then select one or more items to associate with one or more points in the representation (step 307). The points can be associated with planes or other approximation techniques as previously mentioned. As previously noted, items can include information about POIs, virtual objects (e.g., captured media, advertisements, etc.) stored as world data 107, etc. These items can be associated with locations (e.g., via 2D or 3D coordinate systems) associated with the location services platform 103. Items can be selected based on criteria entered by the user. For example, the user can use a touch screen interface to choose one or more categories of items, keywords, associations, tags, etc. that can be utilized to select one or more of the items. In one example, the user may search for a movie theater item. If the movie theater is within a particular range, it can be selected. In other examples, the user may merely point the UE 101 at a scene (e.g., one or more buildings) to receive items associated with one or more locations of the scene.

Moreover, the runtime module 209 can determine to filter the one or more items based, at least in part, on whether the respective one or more points are within the one or more portions. For example, there would be no need to process a sky portion when searching for an item associated with the ground (e.g., a restaurant POI). In certain embodiments, the items are further selected based on user input, such as a keyword or a selected POI entry. When a determination is made to filter items based on portions, the portions need not be processed in a search for the item.

Further, the runtime module 209 can cause tracking of the location, the orientation, or a combination thereof in relation to the spatial layout (step 309). The tracking can include determining location information according to processes described in FIGS. 4 and 5. Moreover, the tracking can be utilized to associate and update locations of items.

At step 311, display information is generated including one or more items overlaid on the representation based, at least in part, on the one or more points. This display information can then be caused to be presented via the user interface 211. Overlaying the information can be based on one or more layers added on top of the representation or based on an augmentation or altering of the representation. Further, the representation can be generated based on the items. When changes to the location are determined based on the tracking, the display information can be updated accordingly.

In one embodiment, the display information can include one or more elements of an image capture module 207 of the UE 101. The runtime module 209 can determine to capture one or more images of the location via the image capture module 207. One or more elements of the one or more captured images are determined according to one or more algorithms. The algorithms can be utilized to detect one or more particular features. For example, features can include moving objects, cars, people, faces, buildings, animals, etc. One or more other representations of the elements can be included in the display information. As such, a semantic blending of the elements with the representations (e.g., one or more preprocessed panoramic images, representations of features, etc.) can be presented to the user.

In another embodiment, as previously mentioned, the display information can be based on a time parameter, a weather parameter, combinations thereof, etc. Thus, the display information can be augmented based, at least in part, on the parameters. This may be accomplished be selecting one or more preprocessed images or models based on the parameters (e.g., an image of snow or particular lighting conditions). Additionally or alternatively, the images or models can be processed to determine the display information according to the parameters (e.g., by changing lighting, adding shadows, etc.). Thus, geographic information system data (e.g., world data 107). Thus, one or more of panoramic images, LIDAR, 3D models, maps, user images, etc. can be restyled according to parameters to better match real-life conditions (e.g., based on weather, time, etc.). Further, the system 100 may be utilized to perform automatic non-photorealistic rendering of the location (e.g., utilize another representation such as a cartoon representation, a clip art representation, etc.) to illustrate the location. Such renderings can be utilized for one or more games, story-telling applications, historical narratives, etc. associated with one or more particular locations to be experienced on the UE 101 (e.g., via a variety of MR effects).

In the example above associated with selecting the movie theater, the movie theater can be tracked according to the above responses. One or more points (e.g., coordinates) of the representation can be associated with the movie theater. Because the movie theater is most likely a building on the ground, sky areas can be filtered from a search for the item. Further, when augmented reality is shown, one or more representations (e.g., icon and/or text) of the movie theater can be presented to the user via a display. Because a known resource (e.g., panoramic image) is being presented to the user as well, additional processing is not needed to re-associate the movie theater with an image presented to the user when the UE 101 is moved.

Figure 4:
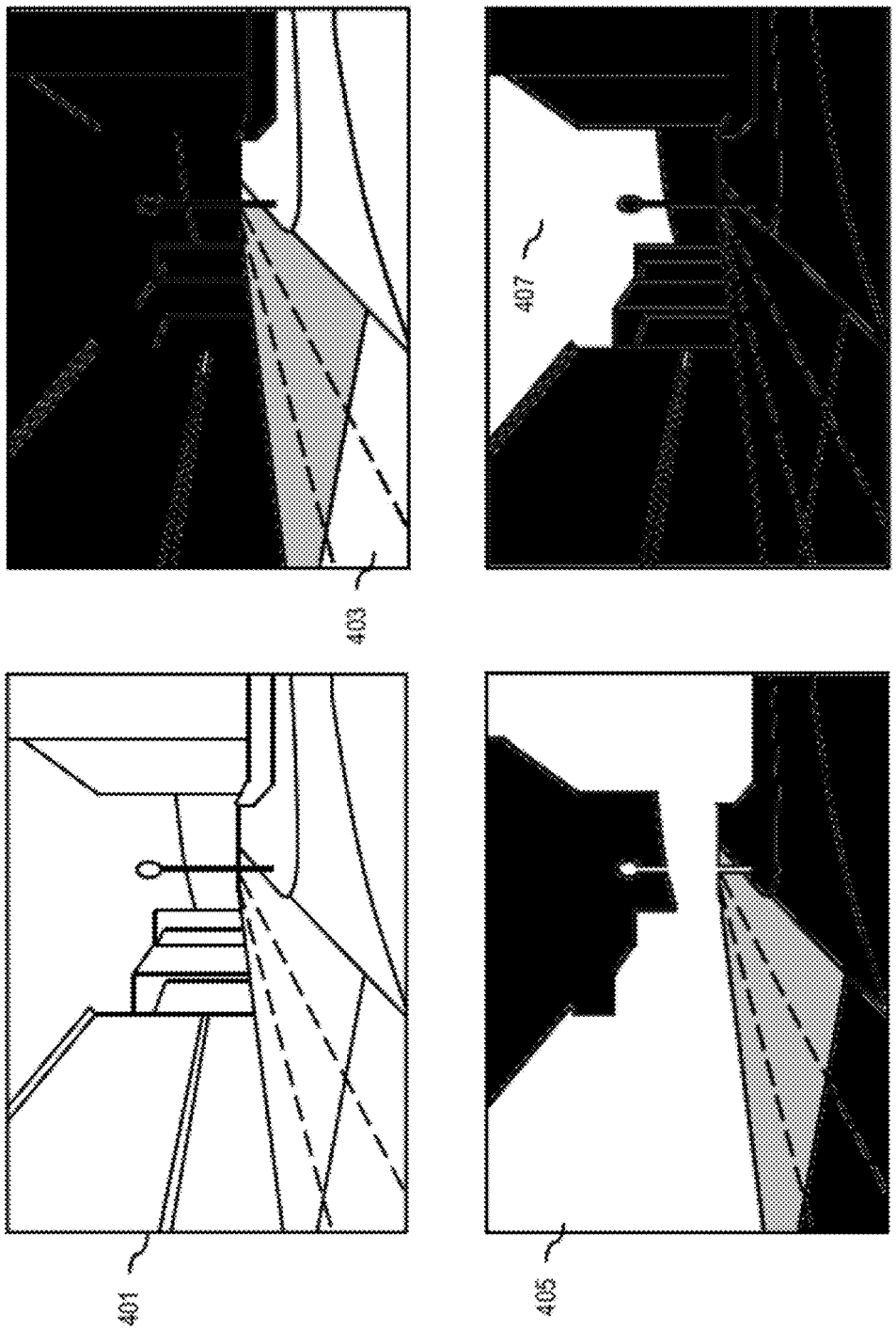
FIGS. 4-5 are diagrams of processing of image representations based on the processes of FIG. 3, according to various embodiments.
Figure 5:
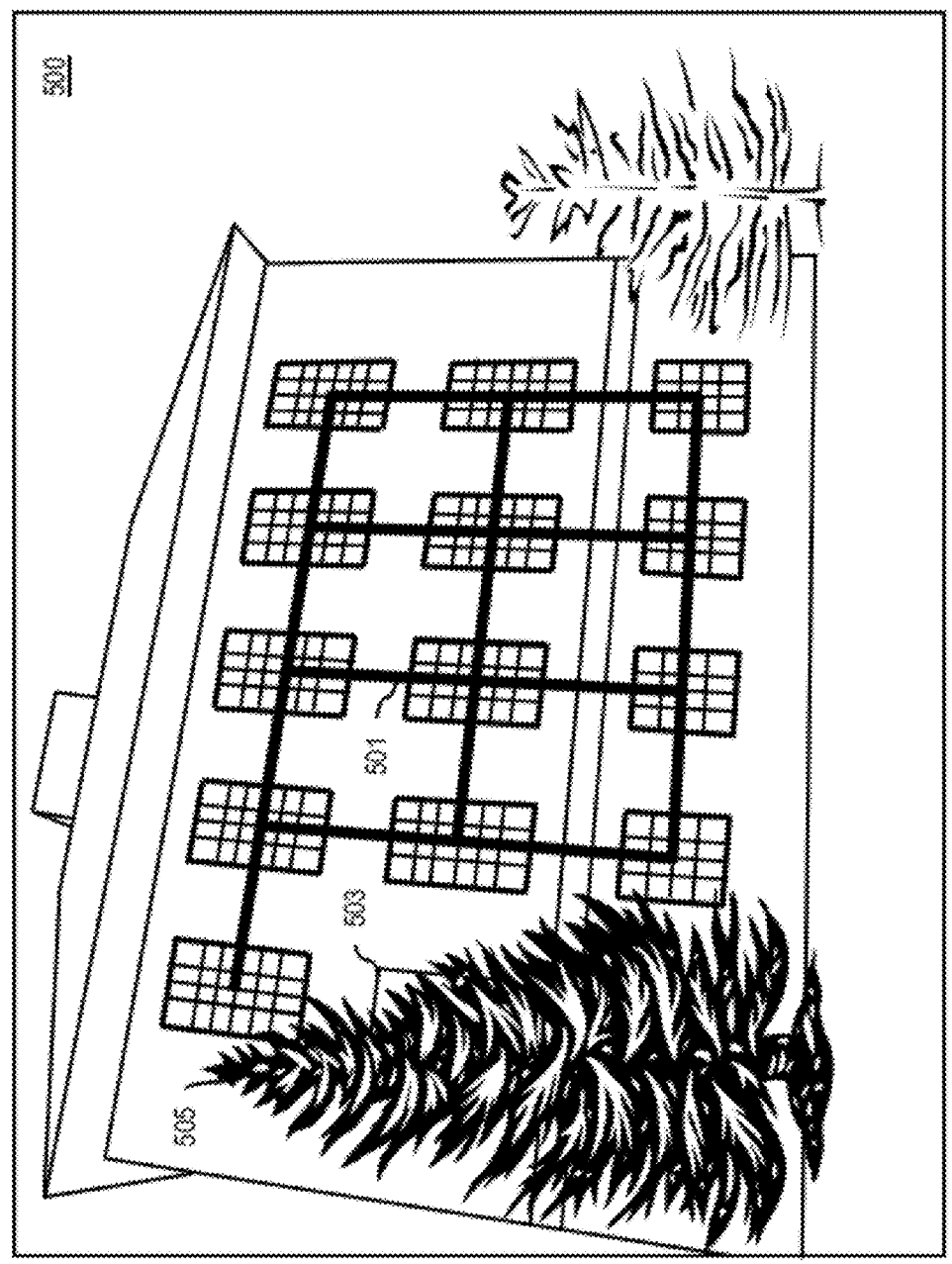

FIGS. 4-5 are diagrams of processing of image representations based on the processes of FIG. 3, according to various embodiments. FIG. 4 shows a sample result from a computer vision technique to extract dominant surfaces of an image. Different semantic properties can be extracted from an input image 401. Each of these properties can enhance tracking quality and realism of AR applications.

Techniques have been utilized to classify an image into its dominant 3D surfaces (e.g., ground, vertical surfaces such as buildings, poles, trees, etc., the sky, etc.). Thus, one or more algorithms can be utilized to classify such surfaces. While such algorithms are useful, it is not necessarily optimal for real-time use. However, with the use of world data 107 of a location services platform 103, the methods can be utilized to quickly generate such a representation from an input image. Optionally, GPS and other inertial sensors associated with the data collection module 111 may be used.

The image processing and recognition used for the classifications can be done within the context of its recovered spatial layout. For example, object recognition modules should not return detections of terrestrial objects floating in air. Virtual objects should be augmented into the scene in such a way that it adheres to the located ground plane and the perspective viewpoint from which the image was taken. Further, to generate realistic AR and MR, these augmentations reason about occlusions and depth ordering in the image. This processing can be accomplished using one or more algorithms to process the input image 401. For example, one or more algorithms can be utilized to generate an estimated ground image 403, a vertical surfaces image 405, and a sky image 407. These images can be represented in other data structures for processing means. Each of these images can be generated using one or more algorithms. Further, the world data 107 can be collected and preprocessed. As such, one or more panoramic or other images associated with a location can be stored in the world data 107 as the input image 401 and other data structures of processing information can be generated and stored in the world data 107. Further, spatial layouts can be generated from one or more images based on one or more algorithms.

Tracking and/or pre-processing can exploit one or more recovered spatial layouts in many ways. Detecting and matching features between two images need not be a purely 2D pattern matching problem, but can instead make use of scene properties. One advantage is efficiency. For example, much of the intensive processing can be restricted to areas in the image that are most relevant. Thus, a tracking engine running on a runtime module 209 would not attempt to detect/track feature points in the sky. An AR application 109 that relies on augmenting natural markers on the ground (e.g. star signs at the Hollywood walk of fame), need not falsely detect similar shapes located off the ground. To improve robustness, the tracking process can model the noise estimate of tracked features based on depth. While 2D tracking treats all image features equally, semantic tracking can incorporate the knowledge that features farther away are less reliable for accurate localization than those nearby. The distribution of tracked features within the image can then model this depth-based uncertainty to yield better pose estimates from frame-to-frame.

FIG. 5 shows a diagram of processing of image representations based on the processes of FIG. 3, according to one embodiment. The image representation 500 includes information determined from an input image. Location-based experiences in AR are often created for specific settings. This knowledge can be utilized as criteria to pre-process large amounts of data collected at the location services platform 103 in order to simplify computations during operation. This is especially beneficial for mobile UEs 101 with limited processing capabilities and/or limited battery power.

Location services platforms 103 can utilize information from large database collection providers such as NAVTEQ. NAVTEQ collects large amounts of annotated urban imagery and 3D LIDAR pointclouds from cities all over the world. Techniques can be utilized to process this data to output a simplified 3D representation of the environment. The processing discussed in FIG. 4 related to determining salient surfaces, while the goal here is to pre-compute a large-scale 3D representation of the location. This model can also be annotated or tagged with additional information such as items, POIs, specific buildings, objects of interest, and different planar surfaces in the scene, or the like. The annotation (done manually or automatically) can serve as training data for machine learning algorithms.

One means of using such data for camera tracking utilizes detected window lattice 501 from an input image of a building facade. When a user captures images or video from the user's UE 101, the system 100 can quickly match these images against an indexed database to recognize building facades that have been annotated as planar surfaces. The indexed database can be stored in memory 217 or be a part of the world data 107. Instead of tracking point feature correspondences and then estimating motion parameters, the camera pose is directly estimated based on one or more plane equations. This formulation also allows additional constraints such as perpendicularity between walls or co-planarity of surfaces to be naturally incorporated. An advantage of using a global 3D model and tracking a few planes within it is that only a few salient structures need to be tracked, while the 3D model can be utilized to connect them together in a physically correct way.

Even without a database of known models, the system 100 can make assumptions on the regularity of urban structures to quickly estimate planar surfaces from the image. The resulting lattice information 501 from a lattice detection algorithm can be utilized to find grid patterns of rectangular structures from an input image. Most windows on building facades appear in a lattice pattern that is horizontally and vertically aligned. By discovering known regularities from an image, the system 100 can infer semantic properties of the scene such as identifying a foreground and background, locating the occluded windows 503 behind the tree 505, reconstructing novel views of the scene for enhanced user experiences, etc. The lattice also embodies the planar structure with a uniform distribution of grid features on the plane of interest. As a result, global cues of vanishing points and horizon estimates can be used for robust pose tracking.

Figure 6:
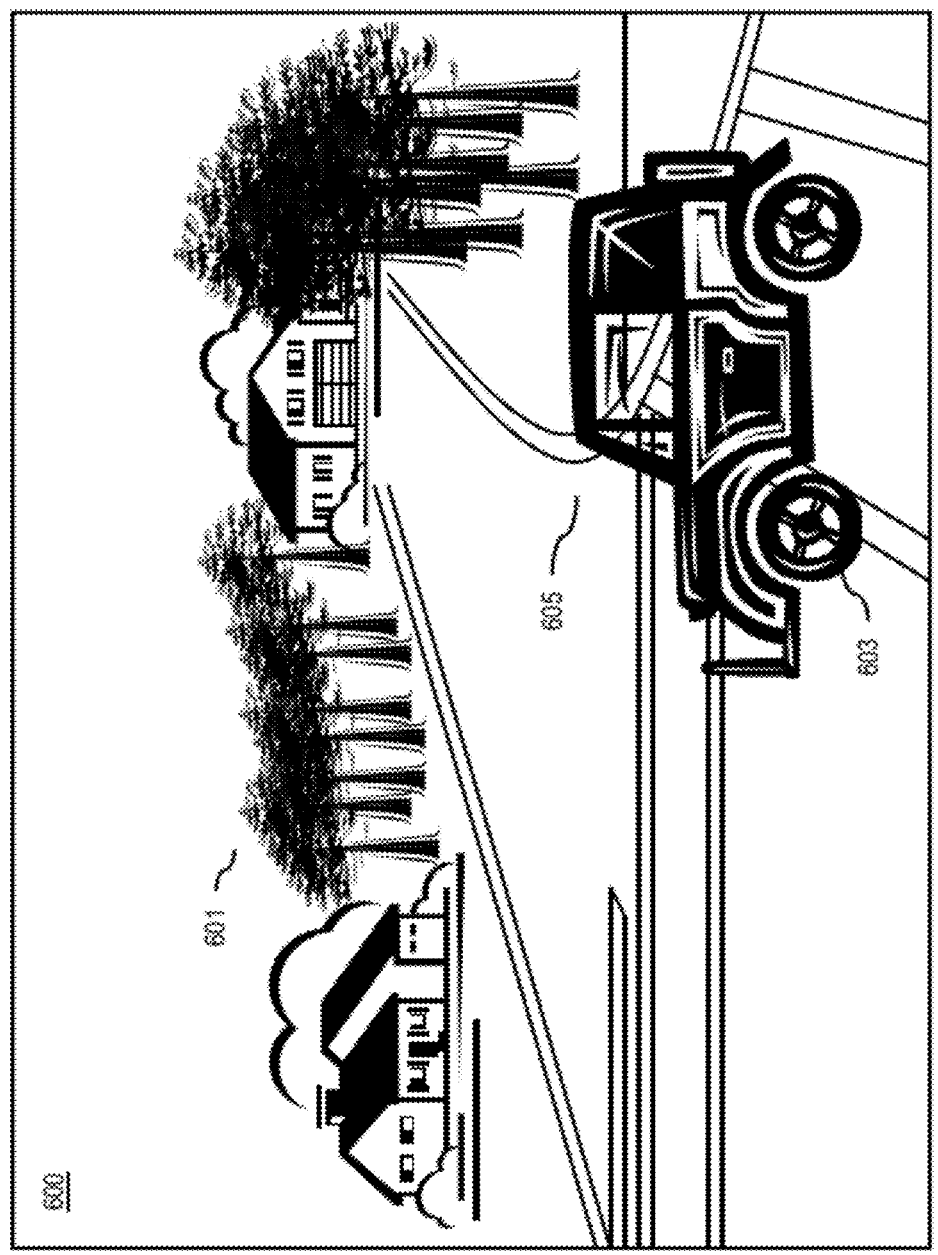
FIG. 6 is a diagram of a user interface utilized in the processes of FIG. 3, according to one embodiment.

FIG. 6 is a diagram of a user interface utilized in the processes of FIG. 3, according to one embodiment. As previously noted, semantic blending of real-time content into one or more virtual canvases can create an improved AR or MR experience. The user interface 600 includes a representation 601 that can be retrieved from world data 107. The application 109 generating the user interface 600 can use semantic blending of real content, such as a moving car 603, into the virtual canvas representation 601 for novel AR experiences.

For example, the virtual canvas representation 601 can be dynamically relit as a virtual world based on properties of the current scene (e.g., based on time parameters, weather parameters, current lighting determined through a camera sensor, etc). A gradient-based method, such as Poisson Editing, can be utilized for a seamless fusion of the real and the virtual. An example of such a technique can be applied to fusing day and night images.

Many of the fused images in Augmented Reality do not adhere to the geometric constraints present in the scene. Geometric and photometric properties of an outdoor scene based on estimated sun and sky characteristics can be utilized in improving an AR experience of a user. Virtual objects can be relit accordingly before augmenting. This can have the effect that shadows 605 and specularities (e.g., specular reflections) on a virtual object are consistent with the other elements in the static scene. For example, trees, buildings, etc. can have shadows (not shown) processed into the image according to a particular lighting scenario based on a time parameter and an association of where the sun is comparatively. Further, elements from the real world (e.g., the car 603) can be added and processed (e.g., to generate the shadow 605). Images from the world data 107 can be augmented with content that is both geometrically and photometrically registered to the scene. This could be especially attractive for virtual advertising. For example, one or more locations on buildings may be utilized to display advertisements (e.g., as billboards).

With the above approaches, augmented content can be efficiently presented to a user by generating a scene to include both virtual content and real-time properties. As such, image-based tracking for Augmented Reality need not be utilized. By reformulating the challenges of tracking within the context of an underlying 3D scene, items can be more easily tracked and associated. A 3D scene can be reasoned to generate a representation while tracking 2D features such as points or lines. To alleviate the burden of real-time processing on UEs, world data 107 collected beforehand can be utilized and processed. This allows making inferences about location, camera viewpoint, and objects in the scene by matching of images into a database (e.g., an indexed database). Characteristics about the environment can be learned through one or more algorithms and that knowledge can be integrated into real-time operation. Further, building an AR experience on a high-fidelity virtual representation of the world that can be dynamically restyled to match with real-time scene conditions user experience and presence can be improved and heightened. Moreover, the system 100 can be utilized to facilitate the creation and deployment of large-scale outdoor experiences. With these approaches, a higher tolerance is available for error when tracking UE 101 movement or otherwise generating tracking information of the UE 101, one or more items associated with a particular location, or a combination thereof. As such, real-time computational demands are lowered because less accurate tracking can be utilized. Thus, in contrast to conventional AR, less variables are present, allowing for a more compelling user experience.

The processes described herein for providing augmented reality based on tracking may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
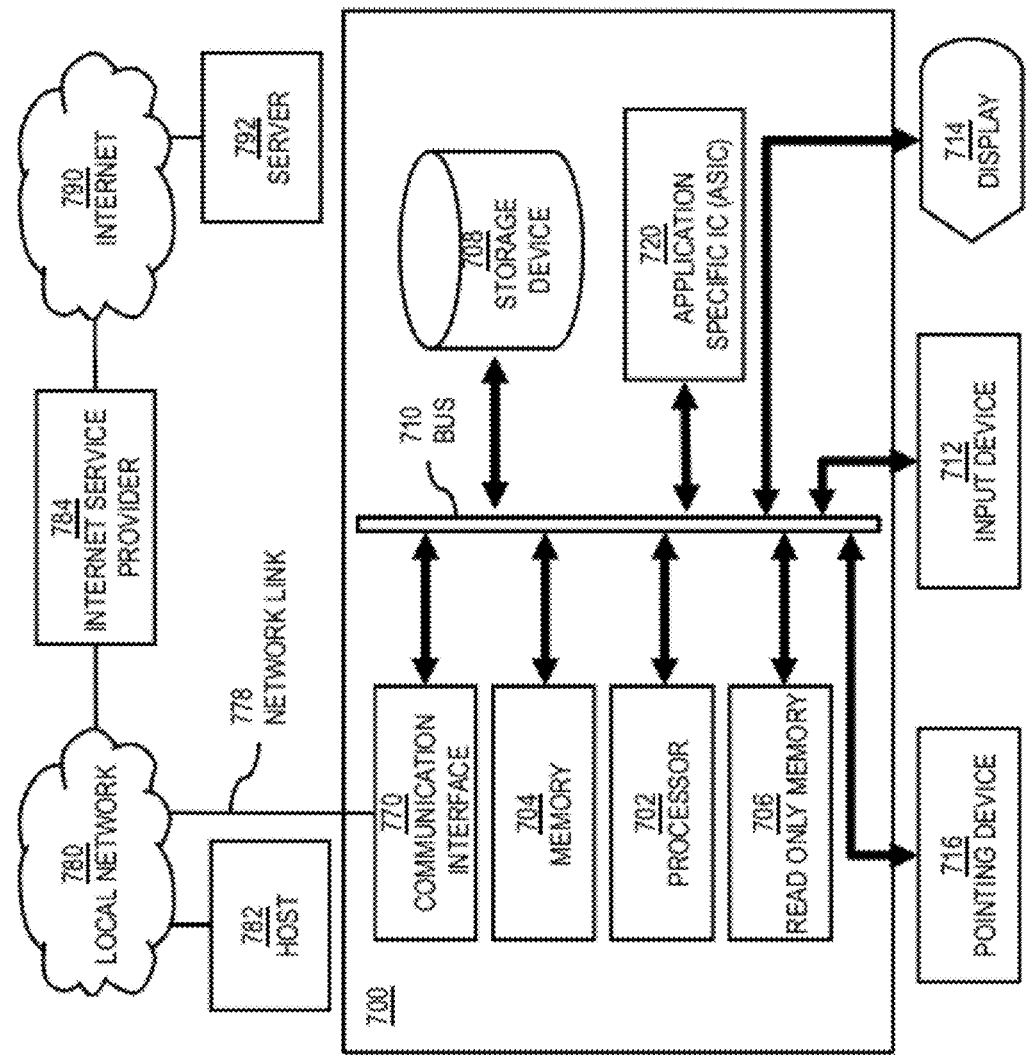
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide augmented reality based on tracking as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing augmented reality based on tracking.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide augmented reality based on tracking. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing augmented reality based on tracking. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing augmented reality based on tracking, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to providing augmented reality based on tracking as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing augmented reality based on tracking.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide augmented reality based on tracking. The memory 805 also stores the data associated with or generated by the execution of the inventive steps.

Figure 9:
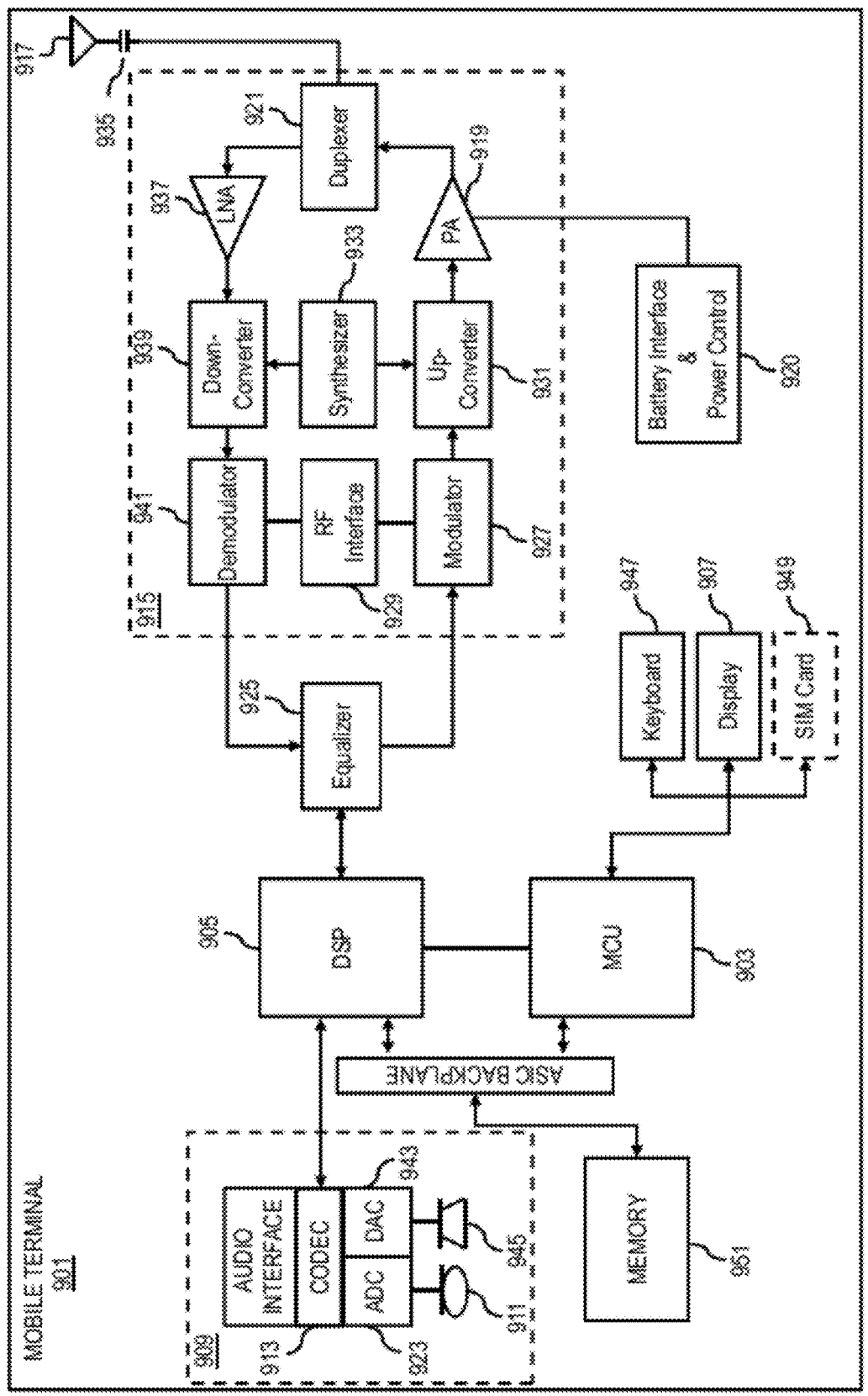
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing augmented reality based on tracking. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing augmented reality based on tracking. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide augmented reality based on tracking. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
determining information including location information, orientation information, or a combination thereof of a device;
determining a representation of a location indicated based on the information and pre-processed world data;
selecting one or more items to associate with one or more points within the representation;
determining to generate display information including the one or more items overlaid on the representation based, at least in part, on the one or more points;
determining to capture one or more images of the location;
determining one or more elements of the one or more captured images; and
determining to generate one or more other representations of the one or more elements for inclusion in the display information,
wherein the representation is a model and includes a real-time moving object blended into the model, and
wherein the selecting one or more items selected comprises a user selecting a category or a keyword regarding a point-of-interest.

2. A method of claim 1, wherein the representation is preprocessed to determine a spatial layout including, at least in part, the one or more points, the one or more points being associated with the one or more symmetrical or repetitive physical features.

3. A method of claim 2, further comprising:
determining to cause at least in part a tracking of the location, the orientation, or a combination thereof in relation to the spatial layout; and
determining to update the display information based, at least in part, on the tracking.

4. A method of claim 3, further comprising:
determining one or more portions of the spatial layout; and
determining to filter the one or more items based, at least in part, on whether the respective one or more points are within the one or more portions,
wherein filtered ones of the one or more items are not processed for inclusion in the display information.

5. A method of claim 1, further comprising:
determining to generate the display information based, at least in part, on a semantic blending of the one or more elements, the one or more other representations, the representation, or a combination.

6. A method of claim 1, further comprising:
determining a time parameter and a weather parameter associated with location; and
determining to augment the displaying information based on the time parameter and the weather parameter,
wherein the spatial layout is a rendering of the representation of the location indicated, and
wherein the rendering is augmented to match current lighting/shadowing and weather based on the time parameter.

7. A method of claim 1, wherein the representation substitutes for a real-time image of the location, and wherein the representation is at least an approximation of the location, the one or more items, tracking information of the device or the one or more items relative to the location, or a combination thereof.

8. An apparatus comprising:
at least one processor; and
at least one memory including computer program code for one or more programs,
the at least one memory and the computer program code configured to, with the at least one processor, cause the apparatus to perform at least the following,
determine information including location information, orientation information, or a combination thereof of a device;
determine a representation of a location indicated based on the information and pre-processed world data;
select one or more items to associate with one or more points within representation;
determine to generate display information including the one or more items overlaid on the representation based, at least in part, on the one or more points;
determine to capture one or more images of the location;
determine one or more elements of the one or more captured images; and
determine to generate one or more other representations of the one or more elements for inclusion in the display information,
wherein the representation is a model and includes a real-time moving object blended into the model, and
wherein the selecting one or more items selected comprises a user selecting a category or a keyword regarding a point-of-interest.

9. An apparatus of claim 8, wherein the representation is preprocessed to determine a spatial layout including, at least in part, the one or more points, the one or more points being associated with the one or more symmetrical or repetitive physical features.

10. An apparatus of claim 9, wherein the apparatus is further caused to:
determine to cause at least in part a tracking of the location, the orientation, or a combination thereof in relation to the spatial layout; and
determine to update the display information based, at least in part, on the tracking.

11. An apparatus of claim 10, wherein the apparatus is further caused to:
determine one or more portions of the spatial layout; and
determine to filter the one or more items based, at least in part, on whether the respective one or more points are within the one or more portions,
wherein filtered ones of the one or more items are not processed for inclusion in the display information.

12. An apparatus of claim 8, wherein the apparatus is further caused to:
determine to generate the display information based, at least in part, on a semantic blending of the one or more elements, the one or more other representations, the representation, or a combination.

13. An apparatus of claim 8, wherein the apparatus is further caused to:
determine a time parameter and a weather parameter associated with location; and
determine to augment the displaying information based on the time parameter and the weather parameter,
wherein the spatial layout is a rendering of the representation of the location indicated, and
wherein the rendering is augmented to match current lighting/shadowing and weather based on the time parameter.

14. An apparatus of claim 8, wherein the representation substitutes for a real-time image of the location, and wherein the representation is at least an approximation of the location, the one or more items, tracking information of the device or the one or more items relative to the location, or a combination thereof.

15. A non-transitory computer-readable storage medium carrying one or more sequences of one or more instructions which, when executed by one or more processors, cause an apparatus to at least perform the following steps:

- determining information including location information, orientation information, or a combination thereof of a device;
- determining a representation of a location indicated based on the information and pre-processed world data;
- selecting one or more items to associate with one or more points within the representation;
- determining to generate display information including the one or more items overlaid on the representation based, at least in part, on the one or more points;
- determining to capture one or more images of the location;
- determining one or more elements of the one or more captured images; and
- determining to generate one or more other representations of the one or more elements for inclusion in the display information,
- wherein the representation is a model and includes a real-time moving object blended into the model, and
- wherein the selecting one or more items selected comprises a user selecting a category or a keyword regarding a point-of-interest.

16. A computer-readable storage medium of claim 15, wherein the representation is preprocessed to determine a spatial layout including, at least in part, the one or more points, the one or more points being associated with the one or more symmetrical or repetitive physical features.

* * * * *